United States Patent [19]

Schure et al.

[11] 4,093,675

[45] June 6, 1978

[54] HIGH PEEL STRENGTH ADHESIVES

[75] Inventors: Ralph M. Schure, Darien; John H. Kooi, La Grange; John M. Brown, Chicago, all of Ill.

[73] Assignee: Unitech Chemical Inc., Chicago, Ill.

[21] Appl. No.: 590,622

[22] Filed: Jun. 26, 1975

[51] Int. Cl.² .................... C08L 67/02; C08L 63/00; C08L 61/06; C08L 61/20
[52] U.S. Cl. .................................. 260/835; 156/320; 156/332; 260/843; 260/850; 260/860; 428/482
[58] Field of Search ............... 260/860, 835, 843, 850; 156/332

[56] References Cited

U.S. PATENT DOCUMENTS

| | | | |
|---|---|---|---|
| 3,013,914 | 12/1961 | Willard | 260/860 X |
| 3,484,339 | 12/1969 | Caldwell | 260/860 X |
| 3,548,026 | 12/1970 | Weisfeld et al. | 260/835 |
| 3,723,568 | 3/1973 | Hoeschele | 260/860 X |
| 3,784,520 | 1/1974 | Hoeschele | 260/860 X |
| 3,833,458 | 9/1974 | Bierman et al. | 156/332 X |
| 3,908,050 | 9/1975 | Gor | 260/850 X |

*Primary Examiner*—Howard E. Schain
*Assistant Examiner*—W. C. Danison, Jr.
*Attorney, Agent, or Firm*—Edward T. McCabe; Charles E. Bouton; Jay C. Langston

[57] ABSTRACT

A polymeric compound having superior thermoplastic adhesive properties is disclosed. The compound is a poly(ester/ether) block copolymer which is extended with an anhydride to introduce carboxyl groups thereinto. Also disclosed are thermoset adhesives having superior properties and which are such carboxylated copolymers that have been crosslinked with a suitable resin.

9 Claims, No Drawings

HIGH PEEL STRENGTH ADHESIVES

The present invention relates to a class of carboxylated polymers that have superior thermoplastic adhesive properties and also superior thermoset adhesive properties when cured with a suitable resin and to methods for preparing these polymers.

Adhesives of the thermoplastic and thermoset variety are conveniently applied to a substrate in the molten state and, upon cooling, form a bond. The current state of the art teaches that it is unrealistic for one to expect to develop a single adhesive, whether it be a thermosplastic resin or a thermoset resin, which has both a high tensile strength and a high peel strength. Thermoplastic adhesives are those adhesives which melt upon being heated and form a bond upon cooling, the bond being substantially heat reversible such that the adhesive will again soften and flow at elevated temperatures with a resulting loss in bond strength. Thermoset resins are adhesives that, once set through heating, do not soften and flow at elevated temperatures; that is, they exhibit creep resistances, even at such elevated temperatures, that are generally superior to those of thermoplastic adhesives.

Adhesives of both the thermoplastic and the thermoset variety have long been sought which would be both tough and elastomeric, i.e., exhibit both a high tensile strength and a high peel strength. Adhesives having a high tensile strength achieve bonds that are tough, but brittle; whereas those of high peel strength are elastomeric, but relatively weak. It is presently widely accepted in the adhesives art that it is not possible for known thermoplastic or thermoset adhesives to exhibit simultaneously both a superior tensile strength and a superior peel strength.

Recent prior art teachings, such as those of Cella, Journal of Polymer Science: Symposium No. 42, pages 727–740 (1973), indicate that certain poly(ester/ether) block copolymers are acceptable thermoplastic adhesives which achieve reasonably high tensile strength adhesion to substrates such as metals. However, these same copolymers exhibit low peel strength.

The prior art also teaches that in order to produce thermoset adhesives having acceptable softening and flow temperatures, one should use very high molecular weight resinous materials, which may or may not be crosslinked. Such prior art advances have developed materials with advantageously high softening points and flow temperatures. However, such known thermoset materials, while exhibiting improved tensile strength and creep resistance, simultaneously undergo a rapid deterioration of their peel strength properties.

It is therefore an object of the present invention to provide both improved thermoplastic and improved thermoset adhesive compositions, and their method of synthesis, that have both high peel strength as well as excellent tensile strength.

Another object of this invention is improved thermoplastic and thermoset adhesive compositions and methods for producing such compositions, which are both tough and elastomeric.

A further object of the present invention is to provide a product and method for producing that product as an improved thermoset adhesive having excellent tensile strength, peel strength, and high-temperature creep resistance.

One other object is the provision of improved thermoset adhesives, and method of preparation, that includes approximately a stoichiometric amount of curing agent and achieves an exceptionally rapid cure time for thermoset adhesives.

Still another object is to provide improved thermoplastic and thermoset compositions and method for making same which exhibit superior adhesive properties even when used on untreated metallic substrates.

It is another object of the present invention to provide a cured polymer thermoset adhesive product having both a crosslinked constituent and a linear flexible block copolymer constitutent to achieve a polymer system that is a block copolymer in which one of the blocks is itself a block copolymer, and method for making same.

The present invention relates to adhesive compositions having both improved peel strength as well as improved tensile strength and the method for their being formed by reacting an hydroxy-terminated poly(ester/ether) block copolymer with an anhydride to thereby introduce carboxyl groups thereinto. This reaction product is a thermoplastic adhesive having the general formula:

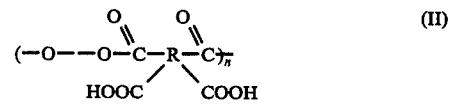

wherein —O—O— is an abbreviated form of formula (I) herein, which is a linear hydroxy-terminated poly(ester/ether) block copolymer, the terminal hydrogen atoms having been removed therefrom; R is alkyl, cycloalkyl or aryl; and $n$ is a number from 1 to 2. A thermoset adhesive is formed by curing this thermoplastic resin with a crosslinking agent.

Other objects and advantages of the present invention will be apparent to those skilled in the art from the detailed description of the invention as follows.

It has been determined that carboxylated poly(ester/ether) block copolymers of the present invention exhibit adhesive properties that are superior to those of known adhesives, including other poly(ester/ether) block copolymers. It has been further determined that exceptional creep resistance at elevated temperatures is exhibited by such carboxylated poly(ester/ether) block copolymers that have been cured with a resin.

The carboxylated copolymer composition of the present invention is a substantially linear, low-to-moderate molecular weight (about 4,000 to 25,000) hydroxy-terminated poly(ester/ether) block copolymer that has been reacted with a dianhydride to be lengthened to a molecular weight of about 6,000 to 50,000 and to have carboxyl groups added thereto. Molecular weights of these polymers, when used throughout herein, are average molecular weights determined by conventional end group analyses for hydroxy (and carboxy) groups, utilizing titration with succinic anhydride.

The hydroxy-terminated, substantially linear poly(ester/ether) block copolymer (I) is itself a polymer reaction product of: (1) one or more of an aromatic, aliphatic, or cycloaliphatic dicarboxylic acid or ester-forming derivative thereof; (2) one or more of a low molecular weight aliphatic, alicyclic, acyclic, or aromatic diol; and (3) one or more of a difunctional polyether, including the poly(alkylene ether) glycols.

Suitable aromatic dicarboxylic acids include but are not limited to terephthalic acid, phthalic acid, isophthalic acid, bibenzoic acid, bis-(p-carboxyphenyl) methane acid, p-oxy-(p-carboxyphenyl) benzoic acid, ethylene bis-(p-oxybenzoic) acid; 1,5-napthalene dicarboxylic acid, 2,6-napthalene dicarboxylic acid, 2,7-napthalene dicarboxylic acid, phenanthrene dicarboxylic acid, and 4,4'-sulfonyl dibenzoic acid. Esterforming derivatives include, for example methyl, ethyl, phenyl, and monomeric ethylene glycol esters, and acid halides, such as acid chlorides, of such aromatic dicarboxylic acid.

Representative aliphatic and cycloaliphatic dicarboxylic acids include sebacic acid, 1,3-cyclohexane dicarboxylic acid, 1,4-cyclohexane dicarboxylic acid, adipic acid, succinic acid, malonic acid, oxalic acid, azelaic acid, suberic acid, pimelic acid, maleic acid, fumaric acid, glutaric acid, 4-cyclohexane-1, 3-dicarboxylic acid, 2-ethylsuberic acid, 2,2'3,3'-tetramethyl succinic acid, cyclopentane dicarboxylic acid, 4,4'-bicyclohexyl dicarboxylic acid, 3,4-furan dicarboxylic acid, and 1,1-cyclobutane dicarboxylic acid. Also included are ester derivatives such as those mentioned relative to the aromatic dicarboxylic acids.

Suitable low molecular weight diols include dihydroxy compounds such as ethylene glycol, propylene glycol, tetramethylene glycol, pentamethylene glycol, 2,2-dimethyltrimethylene glycol, hexamethylene glycol, decamethylene glycol, 1,2-propanediol, 3-methyl-1,5-pentanediol, 1,3-cyclobutanediol, 1,4-cyclohexane-$\beta,\beta$-diethanol, 1,4-cyclohexane-dimethanol, 1,3-cyclopentane dimethanol, 1,4-cyclohexanediol, resorcinol, hydroquinone, 1,5-dihydroxy naphthalene, bis-(p-hydroxy) diphenyl, bis-(p-hydroxyphenyl) methane, and bis-(p-hydroxyphenyl) propane.

The difunctional polyethers are represented by the general formula:

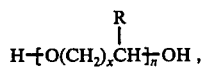

wherein R includes H and $CH_3$, $x$ is an integer from 1 to 11, and $n$ is a number from 2.4 to 136.0. Representative of such compounds are the following poly(alkylene ether) glycols: poly(ethylene ether) glycol, poly(propylene ether) glycol, poly(tetramethylene ether) glycol, poly(pentamethylene ether) glycol, poly (hexamethylene ether) glycol, poly(heptamethylene ether) glycol, poly(octamethylene ether) glycol, poly(nonamethylene ether) glycol, and poly(decamethylene ether) glycol, such polymers having an average molecular weight within the range of about 400 to 6,000.

The hydroxy-terminated poly(ester/ether) block copolymer (I) itself includes two types of blocks, one being a "soft" segment that provides the polymer with a relatively low glass transition temperature and has an elastomeric character, the other being a "hard" segment that provides the polymer with a crystalline domain having a relatively high melting point to lessen chain slippage in the absence of elevated temperatures. For example, the preferred hydroxy-terminated copolymer (I) is prepared from dimethyl terephthalate, dimethyl isophthalate, butane-diol-1, 4 (tetramethylene glycol) and poly(tetramethylene ether) glycol and has an average molecular weight ranging from 600 to 2000. The "hard" segment has an average molecular weight of about 220 and the following structure:

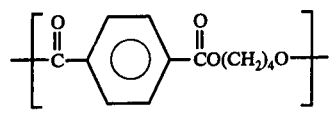

The "soft" segment has an average molecular weight of about 1,130 and a structure:

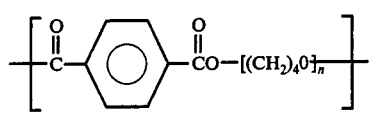

where $n$ is an integer of from about 8 to about 28.

The "soft" segment makes up about 30 to 80% by weight of the total polymer, preferably about 40 to 70% by weight. The "hard" segment makes up about 70 to 20%, by weight of the total polymer, preferably about 60 to 30% by weight.

The carboxylation of the hydroxy-terminated copolymer (I) is accomplished by an anhydride, preferably a tetracarboxylic dianhydride or a mixture of a dianhydride with another acid anhydride. Suitable tetracarboxylic dianhydrides include but are not limited to pyromellitic dianhydride, 1,2,,4,5-tetracarboxycyclohexane dianhydride, 1,2,3,4-tetracarboxybutane dianhydride, naphthalene-1,4,5,8-tetracarboxylic acid dianhydride, tetracarboxycyclopentane dianhydride, and 3,3',4,4'-benzophenone tetracarboxylic acid dianhydride (BTDA).

Generally, at least one mole of such anhydride is needed for each mole of the hydroxy-terminated copolymer so as to transform substantially all of the hydroxy polymer (I) into the carboxylated copolymer (II) of the present invention. When the anhydride is a dianhydride, it serves to extend the polymer chain of from about 1 to about 2 times, up to a maximum molecular weight of about 50,000. Excess dianhydride can likewise be added primarily for the purpose of increasing the acid value of the carboxylated polymer to from about 5 to about 60, preferably 15 to 30. It is believed that the acid value is increased because essentially free carboxyl groups are supplied by such excess dianhydride.

Substantially the same type of acid value increase can be attained by substituting another anhydride, such as, a monoanhydride, for either the entire amount of excess dianhydride or for a portion thereof. Monoanhydrides suitable for this purpose include succinic anhydride, phthalic anhydride, maleic anhydride, methyl-4-endomethylene-tetrahydrophthalic anhydride, hexahydro phthalic anhydride, tetrahydro phthalic anhydride, dodecenyl succinic anhydride, a methylated maleic adduct of phthalic anhydride (known commercially as methyl nadic anhydride), dichloromaleic anhydride, and chlorendic anhydride.

The acid value increase that is achieved by the inclusion of such excess tetracarboxylic dianhydride and/or of such other acid anhydride results in a further toughening of the adhesive (increasing its tensile strength) and also an increasing of the humidity resistance exhibited by the adhesive bond.

The carboxylated polymer (II) of the present invention is useful as a thermoplastic adhesive. Use is accomplished by heating same onto the substrate to be bonded, followed by a cooling period, during which the thermoplastic bond forms. Particularly acceptable results are achieved when the substrate is a metal The carboxylated poly(ester/ether) block copolymer (II) is also useful as a thermoset adhesive (represented by Formula IV herein) upon its being cured or crosslinked with epoxy resins or with aldehyde resins such as melamine-formaldehyde resin and phenol-formaldehyde resin. The thermoset cure is accomplished quickly, within about 5 to 30 minutes, with approximately stoichiometric quantities of curing agent, from about 0.8 to 1.2 moles.

Suitable epoxy resins include those based on bisphenol A and epichlorohydrin that exhibit epoxide equivalents within the approximate range of from about 175 to 4000 and average molecular weights of from about 350 to 3800 and are represented by this general formula:

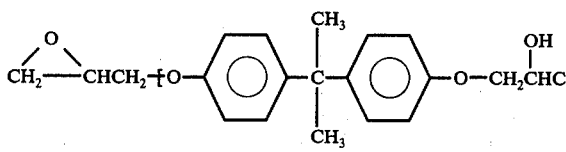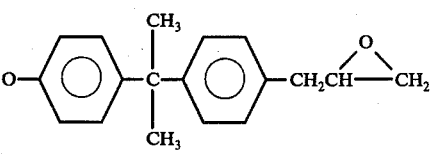

Also included are phenol nolovak epoxy resins having the following formula:

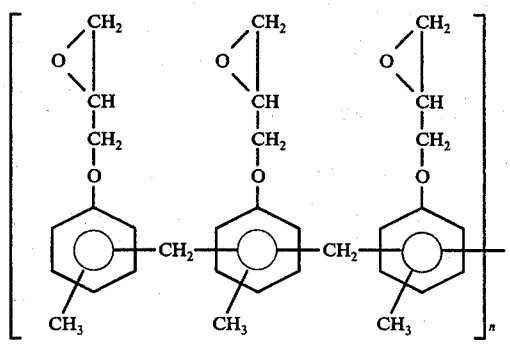

The epoxy resin may also be the tetraglycidyl ether of 1,1,2-tetra-bis-(hydroxyphenyl ethane or a cycloaliphatic epoxide such as 3,4-epoxy-6-methylcyclohexyl-methyl-3,4-epoxy-6-methylcyclohexane carbosylate.

The cured copolymer (IV) includes two segments, the crosslinked resin and a linear flexible block copolymer. It is a polymer system that consists of a block copolymer in which one of the blocks is itself a block copolymer. One of the blocks is a crosslinked carboxy acid network, and the other block is a linear carboxylated poly(ester/ether) block copolymer. The cured copolymer has a structure along the line of Formula IV depicted herein, which structure represents a cured copolymer that is useful as a thermoset adhesive and which, once set, has superior creep resistance, a tensile strength that is often actually stronger than that of the bonded substrate, and an especially significant increase in peel strength. The thermoset resins of this invention can be used in place of solder in any number of applications, for example, in the manufacture and repair of automobile radiators, and as a high temperature adhesive, for example, for use in bonding metal parts in airplanes.

The method of forming the polymers of the present invention is basically one of first forming an hydroxy-terminated poly(ester/ether) block copolymer (I) of moderate molecular weight, about 4,000 to 25,000, and then reacting this copolymer with an anhydride to further extend the poly(ester/ether) block copolymer and to introduce carboxyl groups into the polymer (I) to form a carboxylated polymer (II) useful as a thermoplastic adhesive. An additional step of reacting this latter-formed polymer (II) with a suitable resin results in the formation of a cured polymer (IV) useful as a thermoset adhesive.

More specifically, the hydroxy-terminated copolymer (I) is formed by a polymerization reaction among the dicarboxylic acids or esters, the diols, and the difunctional polyethers described herein. Preferably, the initial reaction is carried out under nitrogen gas at a pressure within the approximate range of 1 to 15 mm Hg, preferably 5 to 10 mm Hg, at a temperature of approximately 150°-250° C., preferably about 190°-210° C., usually in the presence of an ester interchange catalyst and an antioxidant or stabilizer. During this process, methanol distills over, it being a reaction by-product. Once the methanol distillation has ceased, the temperature is increased to about 220°-280° C., preferably about 240°-260° C. and the pressure is maintaned within the range of about 1 to about 15 mm Hg for about 1 to 6 hours so as to form a low-to-moderate molecular weight (about 4,000 to 25,000) polymer. The molecular weight increases with the length of reaction time.

Suitable ester interchange catalysts include: organic titanates, such as tetrabutyl titanate and tetraisopropyl titanate, either alone or in commbination with magnesium or calcium acetate; complex titanates, such as $MgHTi(OR)_6$ or $NaHTi(OR)_6$ from alkali or alkaline earth metal alkoxides and titanate esters; inorganic titanates, such as lanthanum titanate; calcium acetate/antimony trioxide mixtures; and magnesium alkoxides.

The stabilizers may to a phenol derivative, such as 4,4'-bis(2,6-ditertiary-butyl phenol); 1,3,5-trimethyl-2,4,6-tris-(3,5-ditertiary-butyl-4-hydroxy benzyl)-benzene; and 4,4-butylidene-bis(6-tertiary-butyl-m-cresol). Other appropriate stabilizers include inorganic metal salts or hydroxides as well as organic complexes such as nickel butyl dithiocarbonate, manganous salicylate, and copper 3-phenyl salicylate, and copper 3-phenyl salicylate. Also capable of utilization as the stabilizer are mixtures of hindered phenols with esters of thiopropionic acid, mercaptides and phosphite esters. Preferred for used in this invention are amine stabilizers, including: p,p-dioctyldiphenyl amine; N,N-bis(betanaphthyl)-p-phenylene diamine; N,N-bis (1-methylheptyl)-p-phenylene diamine;N-phenyl-N'-(p-toluenesulfonyl)-p-phenylene diameine; N-(3-hydroxybutylidene)-δ-naphthyl amine; diphenyl amine-acetone condensate; and N-phenyl-β-naphthyl amine-acetone condensate.

Representative of the polymerization reaction forming and hydroxy-terminated poly(ester/ether) block copolymer (Formula I) is the following reaction, wherein the dicarboxylic acid or ester is a mixture of dimethyl phthalates, the diol is a glycol, and the difunctional polyether is a polyalkylene ether glycol:

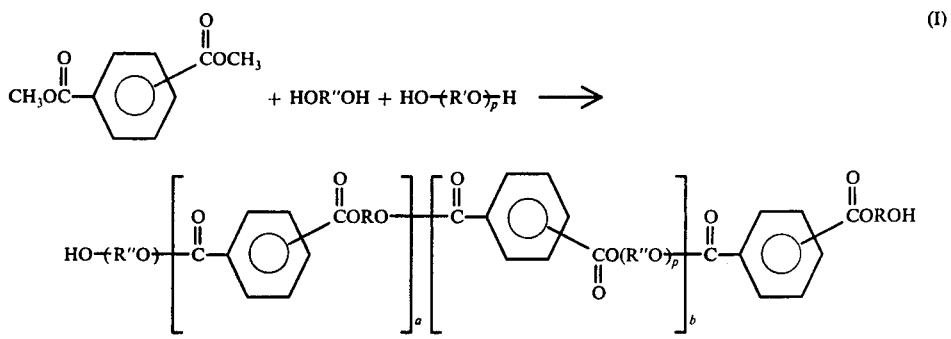

wherein R" and R" are akyl, alicyclic, acyclic, aryl, or arylakyl of from 2 to 12 carbon atoms, and $p$ is a number of from 2.4 to 136.0, $a$ is a number such that the "hard" segment within the first set of brackets makes up about 70 to 20% by weight of the polymer, and $b$ is a number such that the "soft" segment within the second set of brackets makes up about 30 to 80% by weight of the polymer.

The actual values of "$a$" and of "$b$" are functions of the reactants utilized and of the molecular weights thereof. For example, in the preferred embodiment, the dicarboxylic acid or ester is a combination of about .50 to .90 moles of dimethyl terephthalate to about 0.10 to 0.50 moles of dimethyl isophthalate, the diol is 1,4-butanediol, and the difunctional polyether is poly(tetramethylene ether) glycol that ranges between a molecular weight of from about 600 to 2000. In this preferred embodiment, the value of "$a$" ranges between about 0.45 (whereby the hard segment is about 20% by weight) to about 0.96 (whereby the hard segment is about 70% by weight) and the value of "$b$" ranges between about 0.55 (whereby the soft segment is about 80% by weight) to about 0.04 (whereby the soft segment is about 30% by weight).

The carboxylated copolymer (II) according to the present invention is then formed by heating this hydroxy-terminated polymer (I) with an anhydride, preferably a tetracarboxylic dianhydride or a mixture of such dianhydride with another anhydride, at about 100°–220° C., preferably about 165°–185° C. for approximately 2 to 6 hours. At least one mole of the tetracarboxylic dianhydride should be used for each mole of the hydroxy-terminated polymer (I). This step produces the carboxylated poly(ester/ether) block copolymer of this invention (Formula II) by the reaction:

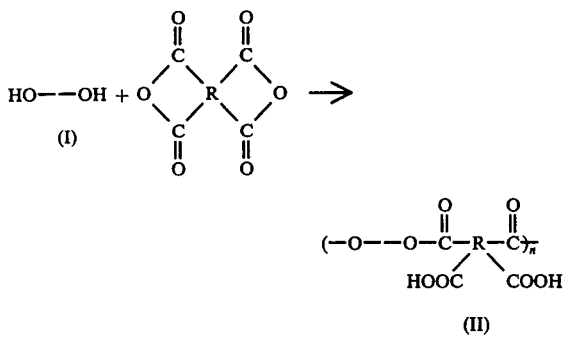

wherein HO—OH represents the hydroxy-terminated polymer (I), R is alkyl, cycloakyl or aryl, and $n$ is a number from 1 to 2. The composition represented by Formula II is a resin that will melt upon being heated for application to a substrate, followed by a cooling period to form a thermoplastic adhesive bond. Such bond has both increased tensile strength and peel strength. Since it is thermoplastic, the bond has little or no creep resistance at elevated temperatures.

Often it is desired to practice the present method to produce polymers having relatively high acid values, from about 5 to 60, preferably about 15 to 30, so as to increase the tensile strength and humidity resistance as discussed herein. Generally, the acid value is increased when the total amount of anhydride added to carboxylate the hydroxy polymer is greater than one mole. For example, in the preferred embodiment, an acid value of about 8 results when 1 mole of BTDA is reacted with 2 mole of the preferred hydroxy-terminated copolymer. The acid value is about 17 to 18 when the molar ratio of BTDA to the hydroxy-terinated copolymer is approximately 3:1, and it is about 30 when this ratio is approximately 6:1. The anhydride addition can be accomplished in one step or in two steps.

It is believed that when the anhydride utilized is a tetracarboxylic dianhydride, one mole thereof combines with each mole of the hydroxy terminated polymer to extend the polymer chain from about 1 to about 2 times, up to a molecular weight of approximately 50,000. It is also believed that the further addition of excess dianhydride, other anhydride, or mixture thereof, will not result in any significant further chain extension, but will instead serve to supply free carboxyl groups to thus increase the acid value of the polymer to 5–60, preferably 15–30.

Preferably, the increase in acid value is accomplished in two steps, whereby one mole of a tetracarboxylic dianhydride is first added to the hydroxy polymer at 100°–220° C., preferably 165°–185° C. for approximately 2 to 4 hours, followed by a second-step addition of excess dianhydride, some other anhydride, or mixtures thereof, as mentioned herein, at approximately the same temperature for about ½ to 2 hours. Alternatively, all of the dianhydride, anhydride or mixtures thereof can be added in one step and heated at 100°–220° C. for about 2 to 6 hours. Adhesives formed in such a single step method generally are softer and are of a lower molecular weight than those produced by the two-step method, although such still perform quite adequately as adhesives.

Polymers useful as superior thermoset adhesives are produced by reacting the polymer represented by Formula II with approximately stoichiometric amounts of an epoxy resin or an aldehyde resin such as those listed elsewhere herein to accomplish a crosslinking type of cure. Generally, the reaction is carried out with a temperature range of about 300°–450° F. (Approximately 150°–235° C.) The hot polymer is applied to the substrate to be bonded. Often, a satisfactory cure is observed within about 5 to 30 minutes. Two major reactions are believed to take place upon curing, a chain extension reaction to form an intermediate (Formula III) and a crosslinking of the chain extended intermediate (III) to form the thermoset resin (represented by Formula IV). These reactions are depicted below, with an epoxy resin as the curing agent.

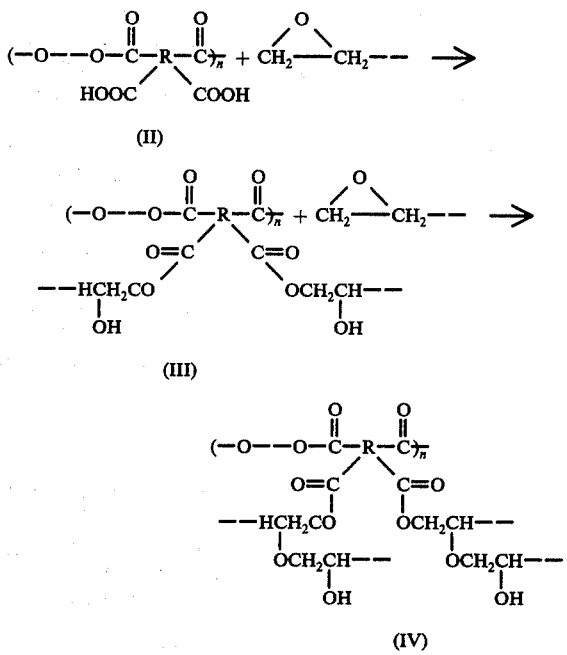

The following examples are set forth as illustrative embodiments of the invention and are not to be taken in any manner as limiting the scope of the invention which is defined by the appended claims.

EXAMPLE I

A hydroxy-terminated poly(ester/ether) block copolymer having a molecular weight of about 17,000 was first made by reacting, under a nitrogen atmosphere, 135.8 grams (0.7 mole) of dimethyl terephthalate and 58.2 grams (0.3 mole) of dimethyl isophthalate with 117.5 grams (1.31 moles) 1,4-butane-diol and 132.6 grams (0.13 mole of poly(tetramethylene ether) glycol (molecular weight of 1,020) at 200° C. in the presence of tetrabutyltitanate, an ester interchange catalyst, and octylated diphenylamine, an antioxidant. After all of the methanol had ceased distilling over, the pressure was reduced to about 12 mm Hg, and the temperature increased to 250° C. These conditions were maintained for about three to four hours, with stirring to prepare a prior art hydroxy-terminated copolymer such as that represented by (I) herein. This known thermoplastic adhesive exhibited a melting point of 140° C., a glass transition temperature of −53° C., and a 15% degree of crystallinity. It was applied to a metal substrate, with heating, to form a thermoplastic adhesive bond having a tensile strength of about 1000 pounds per square inch (psi) on a 1 × 1 inch lap bond of unprimed steel at 77° F. (25° C.) and a peel strength of 40 pounds per linear inch (pli) on unprimed aluminum (approximately 20 mils thick) at 77° F. This polymer contained 44% "soft" segments and 56% "hard" segments.

One mole of the thus prepared hydroxy-terminated poly(ester/ether) block copolymer was heated with one mole of 3,3′,4,4′-benzophenone-tetracarboxylic acid dianhydride (BTDA) at 175° C. for 4 hours. The resulting carboxylated poly(ester/ether) block copolymer was a copolymer such as that represented by (II) herein and had an acid value of 8.0. It was then applied to metal substrates, with heating, to form a thermoplastic adhesive bond having a tensile strength of 1300 psi on unprimed steel and a peel strength of about 50 pli on unprimed aluminum at 77° F.

EXAMPLE II

The carboxylated poly(ester/ether) block copolymer (II) prepared in Example I was applied to metal substrates and co-reacted with an approximate molar equivalent amount of an epoxy resin, ERL4221 (this resin is manufactured by Union Carbide and is a cycloaliphatic epoxide: 3,4-epoxy-6-methylcyclohexylmethyl-3, 4-epoxy-6-methylcyclohexane carboxylate). Similar reactions were also accomplished with each of three epoxy resins of the bisphenol A and epichlorohydrin type of the generalized formula disclosed herein, one having a molecular weight range of 350–400 and an epoxide equivalent of 175–210, another having a molecular weight range of 900–1000 and an epoxide equivalent of 450–525, and the other having a molecular weight range of about 1400 and an epoxide equivalent of 870–1025. Test results on these samples are not available because the test substrates broke during the testing. In this instance, the crosslinked copolymer bond was stronger than the substrate itself, and, when similar tests were run thereafter, stronger substrates were used.

EXAMPLE III

A quantity of 1350 grams (0.021 mole) of the hydroxy-terminated copolymer (I) of Example I was reacted with 16.5 grams (0.051 mole) of 3,3′,4,4′-benzophenone tetracarboxylic acid anhydride at 180° C. for 4 hours. The thus prepared carboxylated poly(ester/ether) block copolymer (II) (acid value, 17.4) had a melting point of 140° C., a glass transition temperature of −43° C. When used as a thermoplastic adhesive, it exhibited a tensile strength of 1490 psi on unprimed steel at 77° F., and a peel strength of 60 pli on unprimed aluminum at 77° F. These tests were conducted as described in Example I.

This carboxylated copolymer was then reacted with 1 equivalent weight of an epoxy resin of the diglycidyl ether of bisphenol A type (mole weight 925) to form a thermoset copolymer having a tensile strength of 3200 psi on unprimed steel and a peel strength of 140 pli on unprimed aluminum at 77° F.

EXAMPLE IV

A carboxylated poly(ester/ether) block copolymer (e.g., Formula II) was prepared in a fashion similar to that of Example I, except that approximately 3 moles of the BTDA were reacted with each one mole of the hydroxy-terminated copolymer (e.g., Formula I) so that the carboxylated copolymer had an acid value of 17.4. The tensile strength and peel strength of the carboxylated copolymer were tested in a manner similar to that of Example I. Average results from 4 groups of tests indicated a tensile strength of 1490 psi and a peel strength of 65 pli.

EXAMPLE V

The carboxylated copolymer prepared in Example IV was reacted with one equivalent of an epoxy resin to form a crosslinked copolymer (e.g., Formula IV). The crosslinked copolymer was tested for tensile strength and peel strength as in Example IV. The average tensile strength was 3700 psi and the average peel strength was 170. Creep resistance tests at elevated temperatures were also conducted to determine the thermoset adhesive properties of the crosslinked copolymer. Creep resistance was determined by using a 1 × 1 inch lap bond on cold-rolled steel, samples thus prepared being then suspended in an oven at about 70° F. (21° C.), with a 2,000 gm. load being attached thereto and the temperature of the oven raised, with the time to bond failure being measured from the time the temperature reaches 300° or 400° F. (149° or 204° C.). The samples passed (i.e., the bonds held) while these conditions were maintained for greater than 100 hours.

EXAMPLE VI

The relative quantities of the preferred components of the hydroxy-terminated copolymers of the present invention were varied as reported in Table A. The molecular weights of these were roughly 18,000. Then 350 grams (approximately 0.019 mole) of each hydroxy-terminated copolymer were reacted, under the conditions previously described, with 19 grams (0.059 mole) of BTDA to form the carboxylated copolymers of this invention having the various acid values listed in Table A. Each carboxylated copolymer was then crosslinked with an epoxy resin, Epon 1004 (having an equivalent weight of 950). The crosslinked copolymers all satisfactorily passed the high-temperature creep resistance test recited in Example V. The tensile and peel strengths, tested as in Example I, are reported in Table A.

TABLE A

| dimethyl tere-phthalate | dimethyl iso-phthalate | Poly(tetra-methylene ether)glycol | 1,4-butane diol | % "soft" | acid value | Tensile Strength (Psi) | Peel Strength (Pli) |
|---|---|---|---|---|---|---|---|
| 135.8g (.70 mole) | 58.20g (.30 mole) | 131.3g (.13 mole) | 117.5g (1.31 mole) | 43.6 | 21.5 | 3200 | 140 |
| 155.2g (.80 mole) | 38.80g (.20 mole) | 131.3g (.13 mole) | 117.5g (1.31 mole) | 43.6 | 21.3 | 2400 | 40 |
| 174.6g (.90 mole) | 19.40g (.10 mole) | 131.3g (.13 mole) | 117.5g (1.31 mole) | 43.6 | 23.0 | 3150 | 33 |
| 135.8g (.70 mole) | 58.20g (.30 mole) | 161.6g (.16 mole) | 113.4g (1.26 mole) | 49.7 | 21.9 | 2620 | 70 |
| 135.8g (.70 mole) | 58.20g (.30 mole) | 101.0g (.10 mole) | 121.5g (1.35 mole) | 36.5 | 22.4 | 3030 | 48 |
| (.60 mole) | (.40 mole) | 131.3g (.13 mole) | 117.5g (1.31 mole) | 43.6 | 19.3 | 2800 | 100 |
| (.50 mole) | (.50 mole) | 131.3g (.13 mole) | 117.5g (1.31 mole) | 43.6 | 16.5 | 3200 | 105 |

EXAMPLE VII

Several different known prior art thermoplastic polymer adhesives were subjected to tensile and peel strength tests on the order of those described in Example I and also to creep resistance tests at 300° F. along the lines of those described in Example V. The test results of four of these known polymers are reported in Table B and include the polymer, "Montac 1050," exhibiting the best properties of those tested.

TABLE B

| Polymer | Tensil Strength (Psi) | Peel Strength (Pli) | Creep Resistance (300° F.) |
|---|---|---|---|
| "Versalon 1140" (General Mills) | 660 | 13 | fails |
| "Dyvax 5050" (Dupont) | 880 | 55 | fails |
| "Montac 1050" (Monsanto) | 1470 | 70 | fails |
| "Eastman 190M" (Eastman) | 1410 | 60 | fails |

The carboxylated copolymers, used as thermoplastic adhesives in Examples I, III and IV, compare favorably with these prior art polymers. In many cases, the tensile strength and peel strength are superior to those listed in Table B; in others, they are roughly the same. The crosslinked copolymers, used as thermoset adhesives in Examples III, V and VI, are generally far superior to those reported in Table B. In addition, these crosslinked polymer all exhibited creep resistance for long periods of time even at 400° F., whereas the polymers tested in the present example failed the creep test at only 300° F.

Obviously, many modifications and variations of the invention as hereinbefore set forth may be made without departing from the spirit and scope thereof, and only such limitations should be imposed as are indicated in the appended claims.

We claim:

1. A high peel strength thermoset adhesive composition which comprises a cured carboxylated poly(ester/ether) block copolymer in which one of the blocks is itself a block copolymer, said cured copolymer being a hydroxy-terminated poly(ester/ether) block copolymer that has been extended and carboxylated with a tetracarboxylic dianhydride and that has been cured with an epoxy resin, a phenol-aldehyde resin, or an amine-aldehyde resin, said carboxylated poly(ester/ether) block copolymer being represented by the formula:

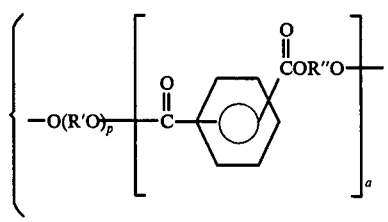

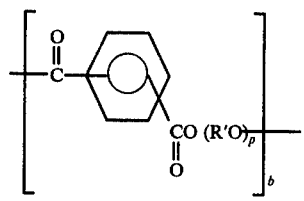

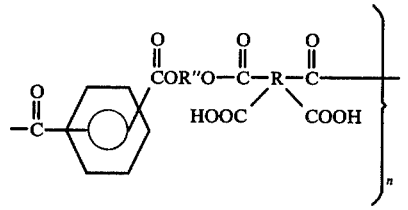

wherein R is alkyl, cycloalkyl or aryl, n is a number from about 1 to about 2, R' and R" are alkyl, alicyclic, acyclic, aryl, or arylalkyl, p is a number from 2.4 to 136.0, a is a number such that the repeating ester block segment within its set of brackets makes up about 70 to about 20 weight % of the polymer, and b is a number such that the repeating ether block segment within its set of brackets makes up about 30 to about 80 weight % of the polymer, said cured carboxylated poly(ester/ether) block copolymer having both a crosslinked carboxy acid network constituent from said epoxy or aldehyde resin and a linear flexible block copolymer constituent and being a creep-resistant, high-tensile thermoset adhesive that simultaneously exhibits high peel strength.

2. The composition of claim 1, wherein said poly(ester/ether) block copolymer has been further carboxylated to an acid value of from about 5 to about 60 with an anhydride selected from the group consisting of a monoahydride, an excess of said tetracarboxylic dianhydride, and a combination of monoanhydride and tetracarboxylic dianhydride.

3. The composition of claim 1, wherein said hydroxy-terminated poly(ester/ether) block copolymer is itself a reaction of: (1) a dicarboxylic acid or ester thereof; (2) a low molecular weight diol; and (3) a polyether that is hydroxy-terminated at both ends.

4. The composition of claim 1, wherein said carboxylated poly(ester/ether) block copolymer has a low-to-moderate molecular weight of approximately 6,000 to approximately 50,000.

5. The composition of claim 1, wherein said cured copolymer is a thermoset adhesive having a tensile strength greater than about 2,000 psi on a 1 × 1 inch lap bond of unprimed cold-rolled steel, has a peel strength greater than about 100 pounds per linear inc on unprimed aluminum panels having a thickness of 20 mils, and exhibits creep resistant properties to support a 2,000 gm. load for at least 72 hours at a temperature above about 300° F.

6. A method for preparing a high peel strength thermoset adhesive, which comprises the steps of: forming an hydroxy-terminated poly(ester/ether) block copolymer; reacting said hydroxy-terminated poly(ester/ether) block copolymer with a tetracarboxylic dianhydride to form a carboxylated poly(ester/ether) block copolymer of the formula:

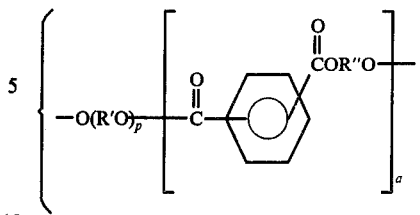

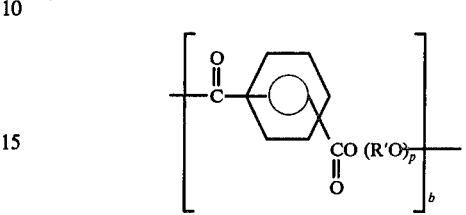

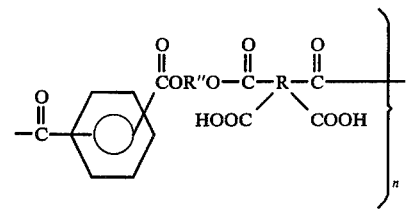

wherein R is alkyl, cycloalkyl or aryl, n is a number from about 1 to about 2, R' and R" are alkyl, alicyclic, acyclic, aryl, or arylalkyl, p is a number from 2.4 to 136.0, a is a number such that the repeating ester block segment within its set of brackets makes up about 70 to about 20 weight % of the polymer, and b is a number such that the repeating ether block segment within its of about of brackets makes up about 30 to about 80 weight % of the polymer; and curing said carboxylated poly(ester/ether) block copolymer at about 300°–450° F. with a curing agent selected from the group consisting of an epoxy resin, a phenol-aldehyde resin, and an amine-aldehyde resin to form a cured copolymer creep-resistent, high-tensile thermoset adhesive that simultaneously exhibits high peel strength.

7. The method of claim 6, wherein said hydroxy-terminated poly(ester/ether) block copolymer is formed by: heating at a temperature of approximately 150°–250° C. and at a pressure of about 1 to 15 mmHg, a reaction mixture of: (1) a dicarboxylic acid or ester thereof, (2) a low molecular weight diol, and (3) a polyether that is hydroxy-terminated at both ends, until methanol distillation ceases; and further heating said reaction mixture at about 220°–280° C. under a pressure of about 1 to 15 mmHg for an additional 1 to 6 hours.

8. The method of claim 6, wherein said reacting step comprises: heating at about 100°–220° C. for about 2 to 4 hours one mole of said hydroxy-terminated poly(ester/ether) block copolymer with about 1 to 6 moles of said tetracarboxylic dianhydride; and adjusting the acid value of said carboxylated poly(ester/ether) block copolymer to about 5 to about 60 by adding an anhydride at about 100°–220° C. for an additional period of about ½ to 2 hours, said anhydride being selected from the group consisting of a monoanhydride, an excess of said tetracarboxylic dianhydride, and a combination of the monoahydride and the tetracarboxylic dianhydride.

9. The method of claim 6 wherein said reacting step comprises heating at about 100°–220° C. for about 2 to 6 hours one mole of said hydroxy-terminated poly(ester/ether) block copolymer with about 1 to 6 moles of said tetracarboxylic dianhydride plus an excess amount of a monoanhydride.

* * * * *